Patented July 17, 1934

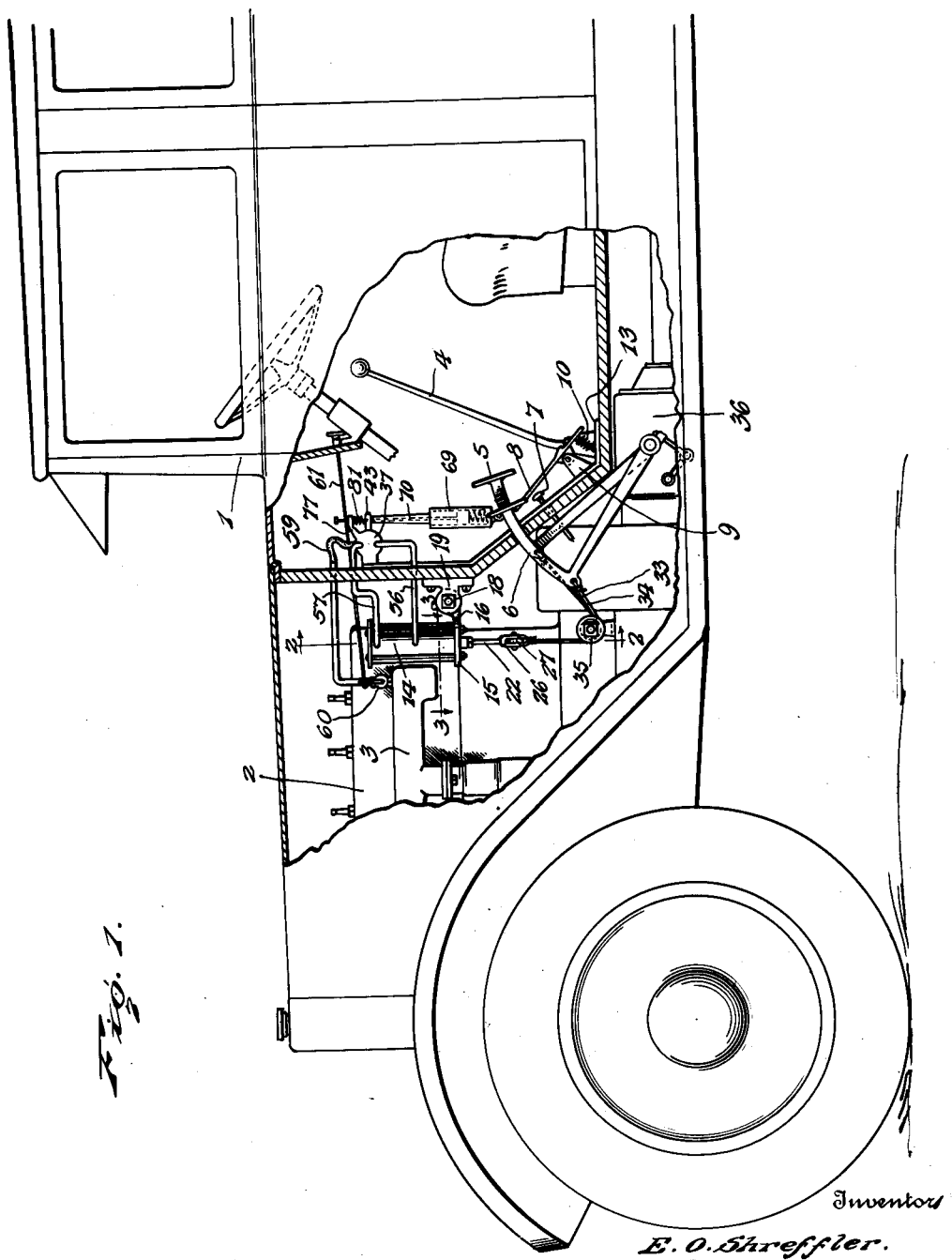

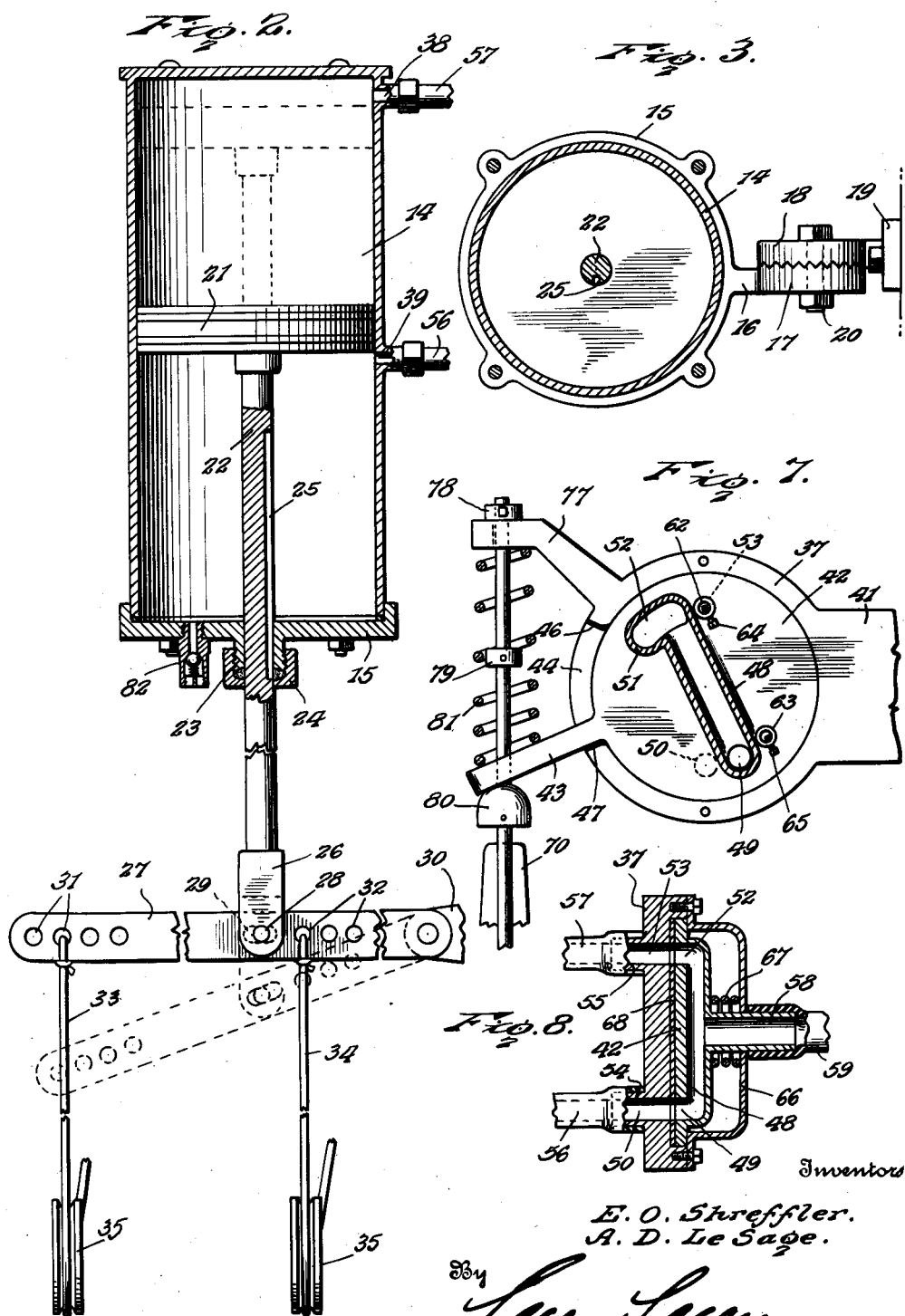

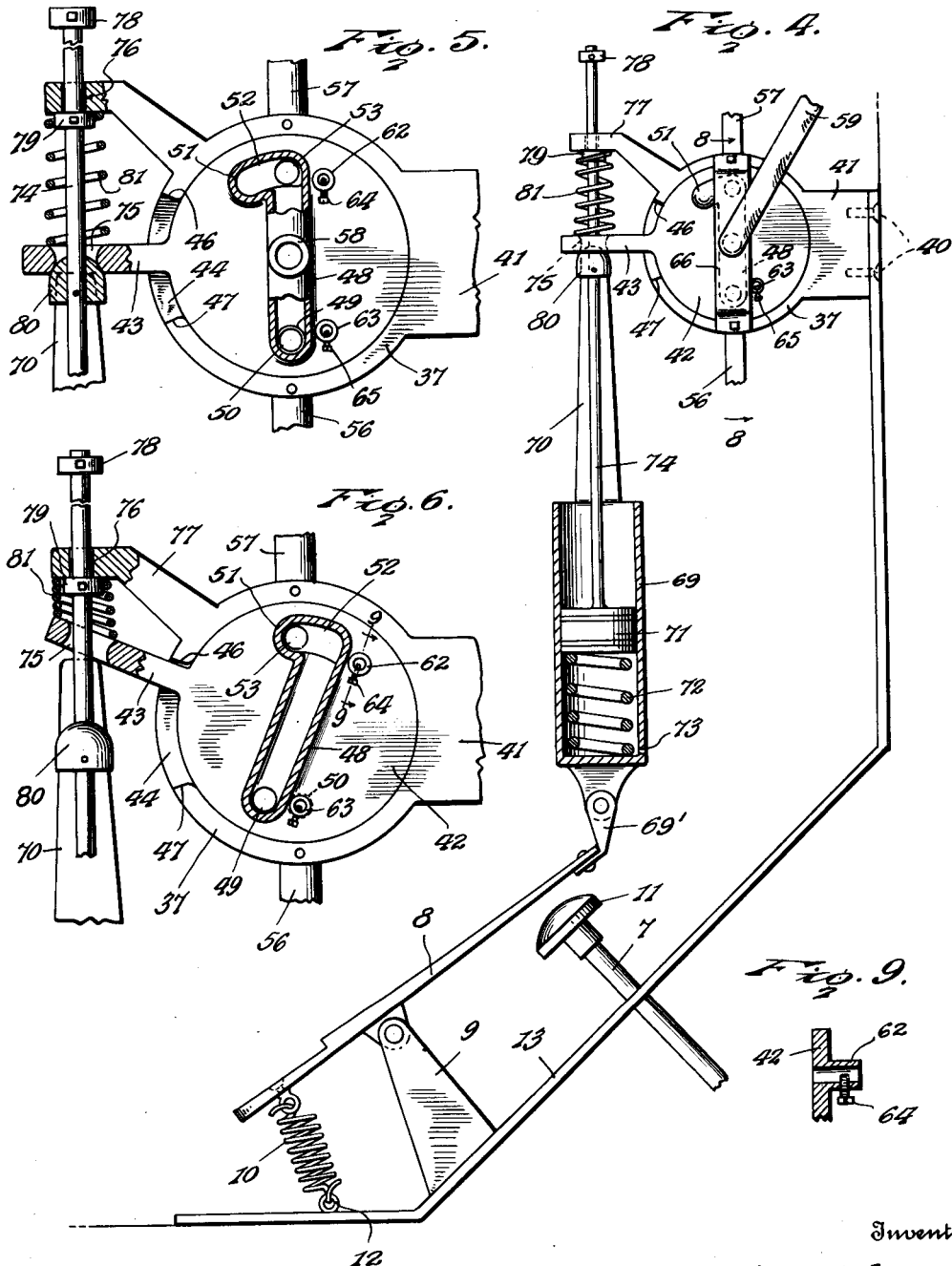

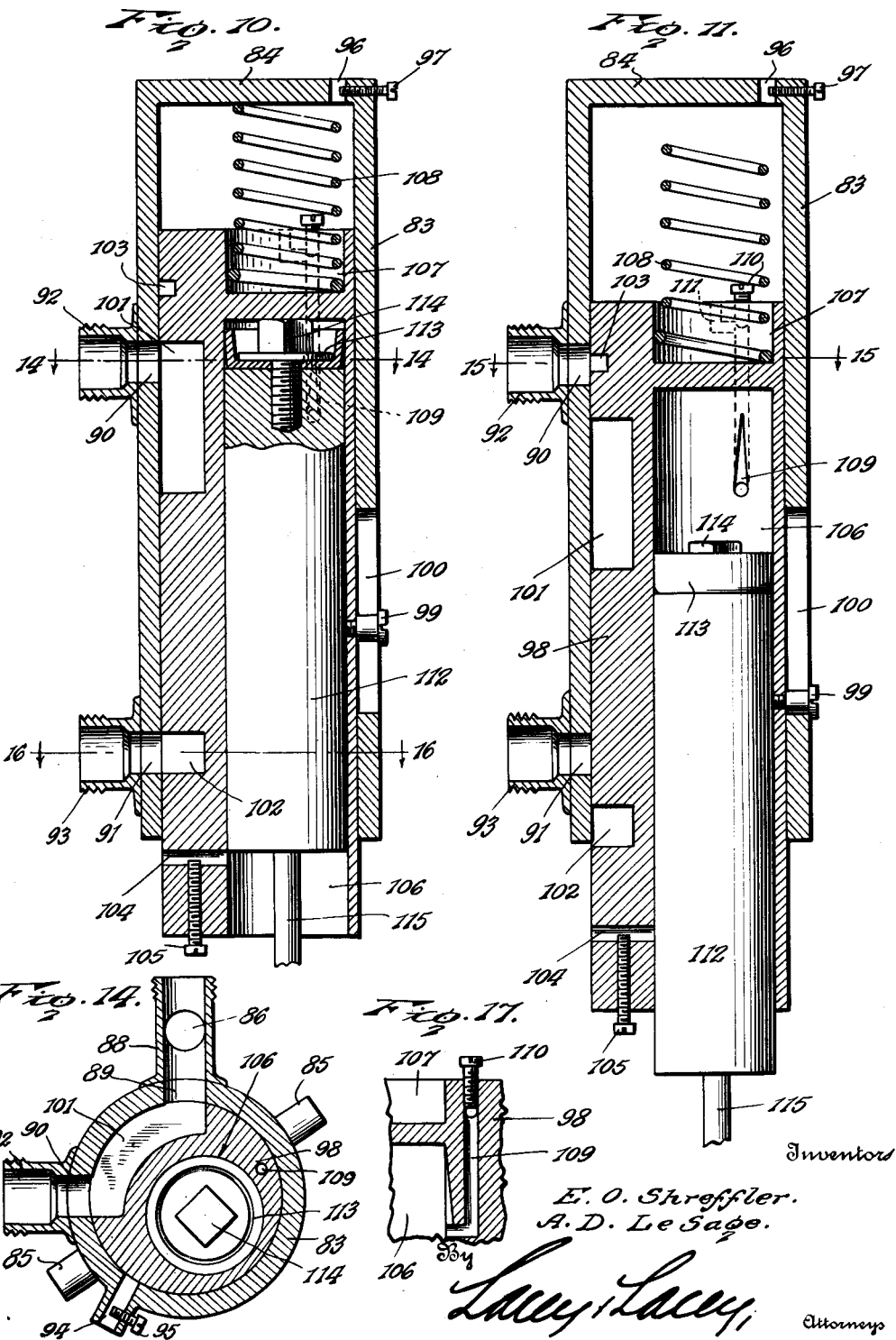

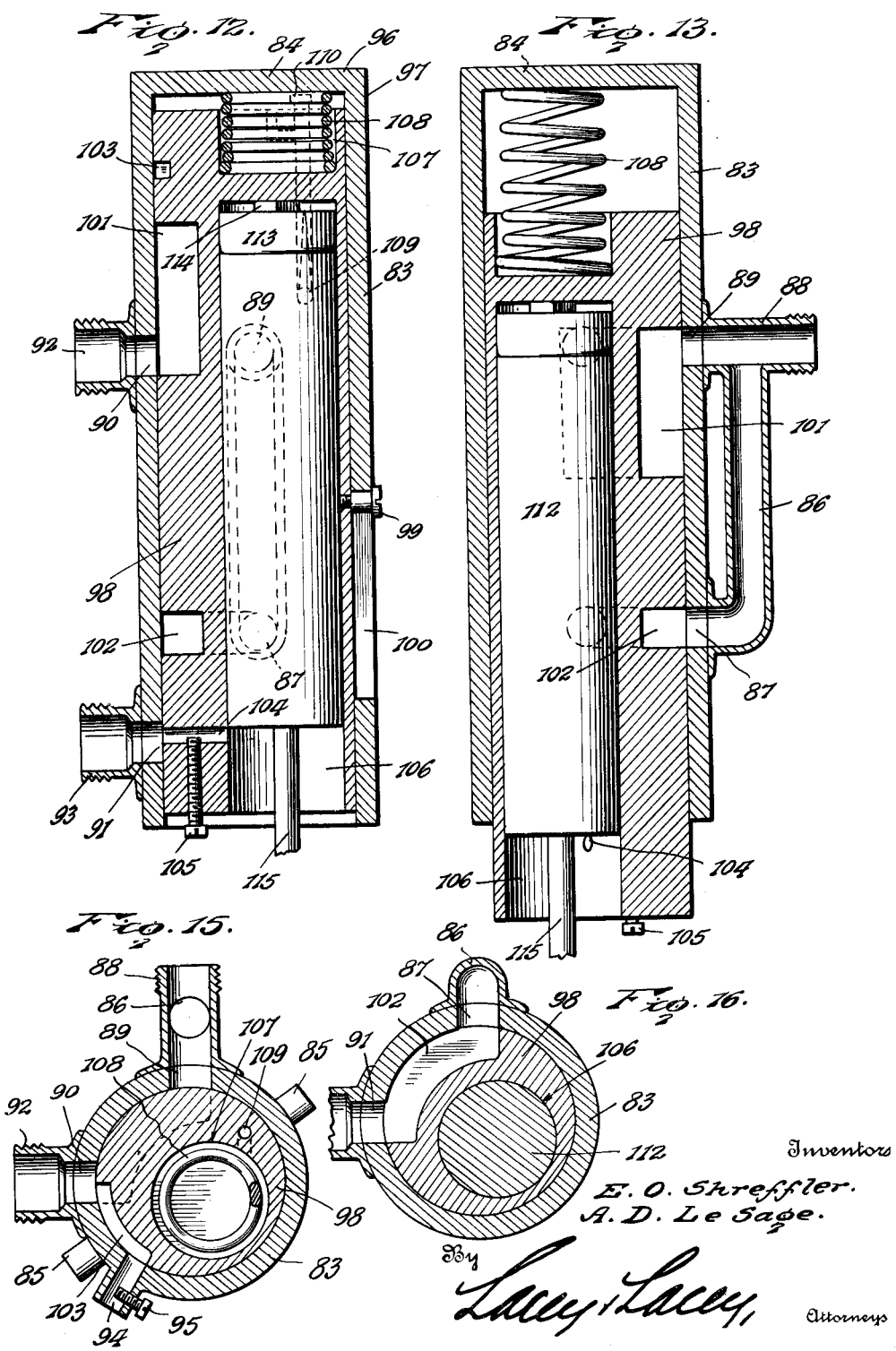

1,966,768

UNITED STATES PATENT OFFICE 1,966,768

VACUUM CONTROLLED CLUTCH AND BRAKE OPERATING MECHANISM

Elwyne O. Shreffler and Aaron D. Lesage, Manteno, Ill.

Application November 8, 1930, Serial No. 494,422

19 Claims. (Cl. 192—.01)

This invention relates to actuating mechanism for the clutch and brake of a motor vehicle and more particularly to an apparatus for this purpose controlled by vacuum.

One object of the invention is to provide an apparatus of this character which may be applied as an accessory to a motor having a brake pedal and clutch pedal of a conventional construction, thereby making it unnecessary to change the conventional brake and clutch controlling mechanism of an automobile and permitting it to be easily applied to vehicles already in use.

Another object of the invention is to so construct the improved apparatus that when it is applied the brake pedal and clutch pedal may be actuated either through the medium of this improved mechanism or by foot pressure in the usual manner, thereby permitting a person to actuate the brake pedal and clutch controlling pedal in the usual manner in case the apparatus should become inoperative or the operator of the automobile should for any other reason prefer not to employ the vacuum controlled actuating mechanism.

Another object of the invention is to so construct the improved apparatus that movements may be imparted selectively to the clutch pedal and brake pedal by pressure applied to a foot support or treadle disposed in operative relation to the accelerator actuating plunger, thereby permitting the clutch and brake and also the accelerator to be accurately controlled by means of one foot. This reduces the number of movements necessary in order to control an automobile and places the car under general control of the driver.

Another object of the invention is to cause the clutch to remain out except when pressure is being applied to the accelerator plunger, thereby permitting the gears to be easily shifted or the brakes applied and in addition provide for free wheeling and allow the gears to be safely shifted at any speed.

Another object of the invention is to so construct this apparatus that the clutch will always be thrown in before the accelerator plunger is pressed upon and thereby insure proper starting of the automobile and in addition so arrange the parts that when the car is in motion and the brake is to be applied the clutch will be thrown out prior to application of the brakes.

Another object of the invention is to permit the clutch to be released without applying the brake when the car is in motion and thereby allow for free wheeling or coasting at whatever speed an automobile may be traveling after which the gears may be shifted and the clutch then again thrown in or the car allowed to drift without power or the brake applied in order to bring the automobile to a stop either quickly or gradually.

Another object of the invention is to provide a device of this character wherein a vacuum is created in a cylinder forming part of the apparatus by suction through a pipe connected to the intake manifold of an internal combustion engine, thereby making it unnecessary to provide a vacuum tank as part of the equipment as the engine when in operation will create the necessary suction to form a vacuum in the cylinder and insure proper operation whenever the engine is running.

The invention is illustrated in the accompanying drawings, wherein

Figure 1 is a view showing the improved apparatus in side elevation and applied to an automobile of a conventional construction, portions of which are broken away to disclose the improved apparatus in place, Fig. 2 is an enlarged vertical sectional view through the improved vacuum tank or cylinder and associated parts, the view being taken on the line 2—2 of Fig. 1, Fig. 3 is a transverse sectional view through the vacuum cylinder taken on the line 3—3 of Fig. 1, Fig. 4 is an enlarged view showing a valve forming a portion of the apparatus together with its adjusting mechanism, the view being principally in side elevation and partially in section, Fig. 5 is a fragmentary view showing the valve in the neutral position of Fig. 4, the view being principally in side elevation and partially in section, Fig. 6 is a view similar to Fig. 5 showing the valve adjusted in order to cause the brakes to be applied, Fig. 7 is a view similar to Figs. 5 and 6 showing the adjusted position of the valve when the accelerator plunger is depressed and the automobile in motion, Fig. 8 is a sectional view through the valve taken on the line 8—8 of Fig. 4, Fig. 9 is a fragmentary sectional view through one of the bleeder ports of the valve taken on the line 9—9 of Fig. 6, Fig. 10 is a vertical sectional view through a modified form of vacuum controlling valve showing the valve in a neutral position to establish free wheeling, Fig. 11 is a view showing the valve with its parts Fig. 12 is a view similar to Figs. 10 and 11 showing the adjustment of the valve which takes place when the brakes are applied, Fig. 13 is a vertical sectional view through the valve when in a neutral position, the view being taken at right angles to Fig. 10, Fig. 14 is a transverse sectional view through the valve taken on the line 14—14 of Fig. 10, Fig. 15 is a transverse sectional view taken on the line 15—15 of Fig. 11, Fig. 16 is a transverse sectional view taken on the line 16—16 of Fig. 10, and Fig. 17 is a fragmentary sectional view illustrating a bleeder passage and a control screw for the same.

In Figure 1, there has been shown an automobile of a conventional construction indicated in general by the numeral 1. The usual internal combustion engine 2 is provided as a power unit which includes an intake manifold 3, and in order to control the automobile, there has been provided the usual gear shifting lever 4, brake pedal 5, clutch pedal 6 and accelerator plunger 7. A foot rest or treadle 8 is pivotally mounted intermedate its length upon a fulcrum 9 with its forward end portion disposed above the accelerator plunger and the rear end of the treadle is engaged by a spring 10 which normally holds the treadle in the position shown in Figs. 1 and 4 with the forward end of the treadle disposed in spaced relation to the head 11 of the accelerator plunger. By this arrangement the treadle may have rocking motion towards or away from the accelerator plunger and when its forward end is pressed downwardly it may have movement to a certain extent independent of the accelerator plunger for a purpose to be hereinafter set forth. The fulcrum 9 and the anchor 12 to which the lower end of the spring 10 is attached may be applied to the foot board of the automobile or carried by a bracket 13. The bracket will be formed with an opening in front of the fulcrum 9 to receive the accelerator plunger and is secured against the foot board of the automobile with its forward end portion extending upwardly against the dashboard and firmly secured against the same.

The vacuum cylinder or tank 14 forming part of this improved apparatus is disposed vertically in front of the dashboard and preferably to one side of the engine and has its lower head 15 provided with an arm 16 terminating in a head 17 having face to face engagement with the head 18 of a mounting bracket 19. Clutch teeth are formed upon the contacting faces of the heads 17 and 18 and through these heads passes a bolt 20 which, when tightened, will retain the teeth of the two heads in engagement with each other and secure the cylinder in a set position. It will thus be seen that the cylinder may be angularly adjusted and firmly secured in a set position. A piston 21 is slidably received in the cylinder 14 for movement longitudinally therein from the neutral position shown in full lines in Figure 2 to either the raised position, indicated by dotted lines in this figure, or a lowered position and from this piston extends a rod 22 which projects outwardly through a neck 23 formed in the lower head 15 of the cylinder. A packing gland 24 is provided upon the neck 23 to prevent leakage of air through this neck when the piston is in the neutral position or its raised position and in order to permit air to pass through the neck when the piston is moving downwardly towards its lowered position or from the lowered position towards its neutral position there has been provided a groove 25 formed longitudinally in the piston rod. This piston rod may be of any length found necessary and at its lower end carries a clevis 26 which straddles a rocker arm 27 and is loosely connected thereto by a pin 28 engaged through alined openings formed in the arms of the clevis and passing through a slot 29 formed longitudinally of the rocker arm. This rocker arm is pivoted at its inner end to a bearing bracket 30 secured against the adjacent side of the engine or to any other suitable support, and openings 31 and 32 are formed in the rocker arm at opposite sides of the piston rod. In selected ones of the openings 31 and 32 are secured cables 33 and 34 which are engaged with guide pulleys 35 and have their rear ends secured respectively to the brake pedal 5 and the clutch pedal 6. It should be noted that the cable 33 is of slightly greater length than the cable 34 and, therefore, when the piston moves upwardly from a lowered position towards a neutral position, the clutch actuating cable will first be drawn upon to move the clutch pedal downwardly and throw the clutch out and continued upward movement of the piston towards the raised position indicated by dotted lines in Figure 2 will impart movement to both pedals and cause the brake to be applied. Therefore, the clutch will be thrown out before the brake is applied and also the clutch may be thrown out in order to shift gears in the transmission 36 without the brake being applied. This is important as it is necessary to throw the clutch out before the gears are shifted and before the brake is applied and this also permits the automobile to coast when so desired and further assures free wheeling and permits the gears to be shifted while the automobile is traveling at any rate of speed.

The valve 37, by means of which formation of a vacuum in the cylinder and passage of air into and out of the same through hollow side arms or ports 38 and 39 leading from the cylinder, as shown in Figure 2, is to be controlled, is secured to the upper end of the bracket 13 by screws or equivalent fasteners 40 passed through openings in the upper end portion of the bracket and engaged in sockets formed in the attaching arm 41 of the valve. The body portion of this valve is circular in side elevation and has one side face recessed to form a seat to receive a disk 42 from which extends an arm 43 projecting through a recess 44 formed in the marginal flange of the valve body and defining abutment shoulders 46 and 47 which limit swinging movement of the arm 43 and turning movement of the disk 42. A conduit 48 extends diametrically across the outer face of the valve disk and has one end terminating in a port 49 to register with a port 50 formed near the bottom of the valve body and its other end formed with a side extension 51 defining a port 52 elongated transversely of the conduit and adapted to establish communication between the conduit and the port 53 formed through the upper portion of the valve body. The ports 50 and 53 are formed through necks 54 and 55 projecting from the valve body and about these necks are engaged ends of pipes 56 and 57, the other ends of which are engaged respectively with the necks 39 and 38 of the cylinder 14. A neck 58 leads outwardly from the conduit intermediate its ends for engagement by one end of a pipe 59 and this pipe extends forwardly through the dashboard and has its forward end attached to a valve 60 carried by and communicating with the intake manifold 3. A control rod 61 for the valve 60 extends rearwardly into the body portion of the automobile where it projects through the instrument board and may be easily reached by the driver of the automobile so that the valve may be opened in order to permit suction to be established through the pipe 59 and pipes 56 and 57 when the valve is in the position shown in Figures 5 and 8. Bleeder glands 62 and 63 controlled by set screws 64 and 65 project outwardly from the valve disk at one side of the conduit 48 and these glands are so disposed that by turning the valve disk they may be selectively moved into and out of position to register with the ports formed through the valve body. An abutment strap or yoke 66 extends diametrically of the valve with its ends secured against the marginal flange thereof, as shown in Figure 8, and this strap slidably receives the neck 58 and is engaged by a spring 67 which bears against the conduit about the inner end of the neck and applies pressure in order to force the valve disk inwardly and form a tight joint between the valve disk and the valve body. A gasket 68 may be provided and cemented or otherwise firmly secured either against the inner face of the valve disk or the valve body in order to insure a tight joint and prevent leakage.

Adjustment of the valve is to be effected through the medium of the foot rest or treadle 8, and in order to do so, there has been provided a dashpot 69, the lower end of which is pivoted to a bracket 69' firmly secured to the forward end of the treadle. An arm 70 rises from the dashpot at one side thereof to engage the arm 43 of the valve and within the dashpot is disposed a piston 71 which is slidable longitudinally therein and rests upon a spring 72 in the lower portion of the dashpot. A small bleeder opening 73 is formed through a wall of the dashpot close to its lower end. From the piston 71 rises a rod 74 which is of greater length than the arm 70 and this rod projects upwardly through an opening 75 formed in the arm or lever 43 of the valve and is also slidably engaged through an opening 76 formed near the free end of an arm 77 carried by the body portion of the valve. Collars 78 and 79 fixed upon the rod 74 above and below the arm 77 limit movement of the rod through the opening 76 and a collar 80 having a rounded upper portion is fixed upon the rod for engagement by the actuating lever 43 which is yieldably held in engagement with this collar by a spring 81 disposed about the rod with one end bearing against the valve lever and its other end engaging the outer end portion of the arm 77. When the valve is in the neutral position shown in Figure 5 or the accelerating position shown in Figure 7, the valve lever bears against the collar 80 but when the valve is in a position to cause the brakes to be applied as shown in Figure 6, the valve lever is moved upwardly out of engagement with this collar by the upper end of the arm 70 of the dashpot.

When this apparatus is in use, it is applied to an automobile as shown in Figure 1. The engine is started in the usual manner and when the valve 60 is opened, a suction is established through the pipe 59 and under normal conditions the treadle 8 remains in the position shown in Figure 4 with the valve in the neutral position. With the valve in this position communication is established between the two ends of the conduit 48 and the pipes 56 and 57, thereby creating a vacuum in the tank or cylinder 14 above and below the piston and the piston will remain in the position shown in Figure 2. The clutch is out and the gear shift lever may then be shifted from neutral to any gear speed position. When pressure is applied to the treadle 8 to move its forward end downwardly into position to engage the head 11 of the accelerator plunger and speed up the engine from an idling speed, the dashpot is drawn downwardly before the treadle makes contact with the accelerator plunger and the spring 81 by expanding acts against the lever 43 to move the valve disk from the position shown in Figure 5 towards the position shown in Figure 7. In this position the conduit 48 is out of registry with the ports formed through the valve body and the port 62 is moved into position to register with the port 53. Therefore, air may enter the cylinder above the piston to break the vacuum and the springs of the clutch and brake will cause the pedals to move to the positions usually occupied when the clutch is in and the brake released. As these pedals move, the pull exerted upon the cables will draw the arm 27 downwardly, thereby moving the piston towards its lowered position, as indicated by dotted lines in Figure 2. Air in the lower portion of the cylinder will be forced outwardly first through the clutch valve 82 at the lower end of the cylinder and then through the groove 25 of the piston rod, thereby preventing an air cushion from being formed and preventing easy movement of the piston. When it is desired to coast or shift gears while the automobile is in operation, the pressure upon the treadle 8 is relieved and as its forward end moves upwardly the dashpot and rod 74 will be raised to return the valve disk to the neutral position. When this takes place, suction will again be established through the pipes 56 and 57 and the piston 21 will be drawn up rapidly until it again reaches the position shown in Figure 2. By this time the pull exerted by the arm 27 upon the cable 34 will have moved the clutch pedal sufficient to throw out the clutch and slack will have been taken up in the cable 33 of the brake pedal. The automobile may then be allowed to coast and free wheeling will be established. Therefore, the gear shift lever may be moved to effect higher or lower speed and pressure then applied to the treadle in order to restore the valve to the accelerating position shown in Figure 7 and again move the clutch pedal to a position to throw the clutch in. If it is desired to stop the automobile by applying the brakes, the rear portion of the treadle is pressed downwardly by the heel after it has reached the neutral position shown in Figure 4 and the valve will be moved to the brake-applying position shown in Figure 6. When in this position, the port 52 is still in registry with the port 53 and the bleeder port 63 moves into registry with the lower port 50 of the valve body. Therefore, suction will be created through the pipe 57 and air will be admitted through the pipe 56 into the lower portion of the cylinder so that the vacuum in the upper portion of the cylinder may draw the piston upwardly to the raised position, indicated by dotted lines in Figure 2. This upward movement of the piston from the neutral position shown in full lines in Figure 2 to the raised position, indicated by dotted lines, will exert pull upon the cable 33 and draw the brake pedal downwardly to apply the brakes. No stoppage in the movement of the treadle 8 is necessary when swinging it from an accelerating position to a brake-applying position and since the cable 34 will be drawn upon to release the clutch before the cable 33 is drawn upon to set the brakes, there will be no danger of the brakes being set without the clutch being thrown out. It should also be noted that when the treadle is moved rapidly toward a brake-applying position the dashpot and the rod 74 will first move as a unit and the spring 72 will then be compressed as air is forced through the bleeder opening 73. By this arrangement the brakes may be very quickly applied without danger or damage to the apparatus. In case the apparatus is applied to an automobile having the brake provided with a stronger spring than the clutch, a single cable having its ends secured to the brake pedal and clutch pedal and its intermediate portion engaged about a pulley attached to the lower end of the piston rod 22 may be employed as the clutch pedal will move easier than the brake pedal and, therefore, when the piston moves upwardly from the lowered position toward the raised or brake-applying position, the pull exerted will first cause the clutch pedal to be moved downwardly to throw out the clutch and the brake pedal then moved downwardly to apply the brakes.

In Figures 10 through 17, there has been illustrated a modified form of valve for controlling passage of air into and out of the cylinder and formation of vacuum therein. This type of valve has a body 83 which is in the form of a cylindrical casing having a head 84 at its upper end and open at its lower end. Trunnions 85 extend from opposite side portions of the valve casing in spaced relation to the upper end thereof, as shown in Figures 14 and 15, for engagement by supporting means so that the valve may be suspended in an upright position above the forward end of the treadle 8. A conduit 86 extends longitudinally of the casing and has its lower end secured against the casing about a port 87 formed therein and the upper end of the conduit terminates in a head 88, the inner end of which is secured against the casing about a port 89 and the outer end of which is adapted for engagement by the tube or pipe 59. Other ports 90 and 91 are formed through the wall of the cylinder in vertically spaced relation to each other and these ports are spaced from the ports 87 and 89 circumferentially of the casing and communicate with necks 92 and 93 for engagement respectively by the pipes 57 and 56. A smaller port 94 controlled by a set screw 95 is formed through the wall of the valve casing, as shown in Figures 14 and 15, in spaced relation to the port 90 circumferentially of the casing and in the head 84 of the casing there has been formed a port 96 controlled by a set screw 97.

Within the valve casing or body is disposed a plunger or block 98 which fits snugly in the casing and is guided when moved therein by a screw or headed pin 99 projecting outwardly through a slot 100 formed in the wall of the casing longitudinally thereof. By this arrangement the plunger or slide block will be prevented from turning in the casing out of its proper position and also the extent to which it may move longitudinally in the casing will be limited. Circumferentially extending grooves or passages 101 and 102 are formed in the sliding block or plunger to register with the ports 90 and 91, and it should be noted that the passage 101 is of such depth that it may communicate with the port 90 when the plunger is in either the position shown in Figure 10 or that shown in Figure 12. When, however, the plunger is in the position shown in Figure 11, neither of these passages register with the ports 90 and 91 but a passage 103 formed in the plunger above the passage 101 will register with the port 90 and establish communication between this port and the port 94, as shown in Figure 15. When the passages 101 and 102 are in registry with the ports 90 and 91, communication is established between these ports and the ports 87 and 89, as shown in Figures 14 and 16. A port 104 formed radially of the plunger and controlled by a set screw 105 is adapted to register with the port 91 and establish communication between this port and the lower portion of a cylindrical chamber 106 when the block or plunger is in the position shown in Figure 12, thereby establishing communication between the port 39 of the cylinder 14 and the atmosphere. The chamber 106 terminates in spaced relation to the upper end of the block or plunger and above this chamber is formed a pocket 107 to receive the lower end portion of a spring 108 and retain this spring in an upright position in which its upper end may contact with the inner face of the head 84 and the spring be compressed as the plunger moves upwardly in the valve casing to the elevated position shown in Figure 12. A passage 109 of small diameter leads from the upper portion of the chamber 106 upwardly through the block and has its upper end portion threaded to receive a set screw 110, and from an inspection of Figure 17 it will be readily seen that, by adjusting this screw, flow of air through this passage by way of its side branch 111 may be regulated. A piston 112 is snugly received in the chamber 106 for sliding motion longitudinally therein and this piston has its upper end equipped with a sealing member 113 secured by a screw 114 in order that air may be forced upwardly ahead of the piston as the piston moves upwardly in the chamber and this air forced outwardly through the passage 109. By this arrangement upward movement of the piston in the chamber will be checked by an air cushion as the piston moves upwardly and the air then forced through the passage in order to allow the pistons to move to the upper end of the chamber, as shown in Figures 10, 12 and 13. A rod 115 extends downwardly from the lower end of the piston and the lower end of this rod may be connected with the treadle in any desired manner.

When this form of control valve is in use, it is mounted in a vertical position above the forward end of the treadle and the lower end of the rod 115 is pivotally connected to the front end of the treadle by having a side extension engaged through the bearing bracket 69' or in any other desired manner. The engine is started and suction through the pipe 59 creates suction through the conduit 86 and passageways 101 and 102, thereby causing suction through the ports 90 and 91 and pipes 57 and 56 to retain the piston 21 in the neutral position shown in full lines in Figure 2. Therefore, the clutch will be out to establish free wheeling and the lever 4 may be moved to shift gears. By pressing upon the treadle to depress its forward end the plunger 112 will be drawn downwardly and the block 98 will assume the position shown in Figure 11. Therefore, the port 103 will register with the ports 90 and 94 to admit air to pass through the pipe 59 into the upper portion of the cylinder 14 above the piston and the piston will move downwardly to the lowered position, and as it moves downwardly to the lowered position air will be forced out of the cylinder through the check valve 82 and groove 25. When this movement takes place, the clutch pedal will be moved upwardly by its spring to throw in the clutch and continued downward movement of the treadle will depress the accelerator plunger until the automobile is moving at the desired speed. When it is desired to shift gears or coast, the treadle is allowed to move upwardly to the normal position, thereby exerting pressure upon the rod 115 to force the piston 112 and block 98 back to the position shown in Figures 10 and 13, thereby again moving the passages 101 and 102 into registry with the ports 90 and 91 and creating suction through the ports 38 and 39. This will create vacuum in the upper portion of the cylinder 14 and the piston will be drawn upwardly until it reaches the position shown in full lines in Figure 2 where it will come to a stop due to the vacuum being equalized above and below the piston. The gears may then be shifted for higher or lower speed and the treadle then again depressed to throw the clutch in and force the accelerator plunger downwardly. If the brakes are to be applied, the treadle is pressed upon by the heel and after reaching the normal position shown in Figure 4 its forward end will be raised in order to force the piston and block to the position shown in Figure 12. When in this position, the passage 101 registers with the port 90 but the passage 102 is closed and the port 104 registers with the port 91. When the block is in this position, upward movement of the piston 21 is continued to the raised position, indicated by dotted lines in Figure 2, and air is admitted through the pipe 56 into the cylinder 14 so that the piston may move upwardly freely. Therefore, after the clutch has been thrown out by a pull upon the cable 34, the cable 33 will be tightened and drawn upon to depress the brake pedal and apply the brakes. If the automobile is moving forwardly and it is necessary to stop suddenly, pressure of the heel upon the rear portion of the treadle will swing the forward end thereof rapidly to a raised position. Under such conditions the piston 112 will act as a pump and air pressure will be built up in the upper portion of the chamber 106 which will momentarily arrest upward movement of the piston when in the position shown in Figure 10 and the plunger will then move upwardly to the upper end of the chamber 106 and uncover the port 104, as shown in Figure 12. In view of the arrested movement of the piston, suction of air through the port 38 will continue until the piston 21 moves across the port 39 to the position shown in Figure 2 and by this time the piston 112 will have moved to the position shown in Figure 12, thereby permitting air to enter the cylinder 14 beneath the piston 31 and this piston will be drawn to the raised position by the vacuum in the upper portion of the cylinder. It will thus be seen that the piston 21 will be drawn rapidly upwardly from the lower end of the cylinder 14 to the neutral or free wheeling position in which the clutch is thrown out and the brake then applied very rapidly. It will be readily seen that if movement of the piston 112 to the brake-applying position were not interrupted it would reach the brake-applying position before the piston 21 reached the neutral position and air would be admitted to the cylinder 14 through the port 39 above the piston and cause a slower upward movement of the piston as the vacuum would not be as effective. It will thus be seen that the principle of the form of control valve shown in Figures 10 through 17 is the same as that of the valve previously described but the construction of the valve and its operating mechanism is quite different.

It should also be noted that when either form of valve is used pressure upon the treadle may be gradually reduced in order to regulate speed of the engine and the valve will not assume a neutral free wheeling position until the treadle is out of engagement with the accelerator plunger, whereas when pressure is suddenly removed from the treadle while the car is in motion in order to declutch while shifting gears or coasting, the pressure built up by the air trapped in the dashpot or the chamber 106 will cause the valve to assume a free wheeling position before the engine reaches the idling point and forward surging caused by the car moving at a higher rate of speed than the engine eliminated.

Having thus described the invention, we claim:

1. Apparatus for controlling a motor vehicle including an accelerator plunger, a brake pedal and a clutch pedal, a treadle to operate said plunger yieldably held in a normal position with its front end over the accelerator plunger in spaced relation thereto, fluid actuated means connected with the brake pedal and clutch pedal to selectively move the pedals, and means operated from said treadle to regulate said fluid actuated means and control movements of said pedals.

2. Apparatus for controlling a motor vehicle including an accelerator plunger, a brake pedal and a clutch pedal, a treadle to operate said plunger pivotally mounted intermediate its length and yieldably held in a normal position with its front end over the accelerator plunger in spaced relation thereto, fluid actuated means connected with the brake pedal and clutch pedal to selectively move the pedals, and means operated from said treadle to regulate said fluid actuated means and cause the clutch to be thrown in when the treadle is moved to depress the accelerator plunger and the clutch first thrown out and the brake then applied when the treadle is moved in an opposite direction.

3. Apparatus for controlling a motor vehicle including an accelerator plunger, a brake pedal and a clutch pedal, a treadle to operate said plunger yieldably held in a normal position with its front end over the accelerator plunger in spaced relation thereto, vacuum actuated means including a cylinder and a piston slidable longitudinally therein and having a piston rod extending externally of the cylinder, means connecting the piston rod with said pedals and adapted to actuate the clutch pedal prior to the brake pedal when the piston moves from an accelerating position adjacent one end of the cylinder towards a brake-applying position adjacent the other end of the cylinder, and a valve actuated from said treadle to control passage of air into and out of said cylinder.

4. Apparatus for controlling a motor vehicle including an accelerator plunger, a brake pedal and a clutch pedal, a treadle to operate said plunger yieldably held in a normal position with its front end over the accelerator plunger in spaced relation thereto, vacuum actuated means including a cylinder and a piston slidable longitudinally therein and having a piston rod extending externally of the cylinder, means connecting the piston rod with said pedals and adapted to actuate the clutch pedal prior to the brake pedal when the piston moves from an accelerating position adjacent one end of the cylinder towards a brake-applying position adjacent the other end of the cylinder, the cylinder having a port intermediate its length and a port adjacent its last-mentioned end, and a valve having a body formed with ports connected with respective ports of the cylinder and a regulating element movably mounted and formed with a conduit adapted to be connected with a source of suction and movable with the element into and out of position to register with the ports of the valve body.

5. Apparatus for controlling a motor vehicle including an accelerator plunger, a brake pedal and a clutch pedal, a treadle to operate said plunger yieldably held in a normal position with its front end over the accelerator plunger in spaced relation thereto, vacuum actuated means including a cylinder and a piston slidable longitudinally therein and having a piston rod extending externally of the cylinder, means connecting the piston rod with said pedals and adapted to actuate the clutch pedal prior to the brake pedal when the piston moves from an accelerating position adjacent one end of the cylinder towards a brake-applying position adjacent the other end of the cylinder, the cylinder having a port intermediate its length and a port adjacent its last-mentioned end, and a valve having a body formed with ports connected with respective ports of the cylinder and a regulating element movably mounted and formed with passages and ports movable into and out of registry with ports of the valve body by selective movements of the regulating element whereby passage of air into and out of the cylinder may be controlled and the piston moved to adjusted positions.

6. Apparatus for controlling a motor vehicle including an accelerator plunger, a brake pedal and a clutch pedal, a treadle to operate said plunger yieldably held in a normal position with its front end over the accelerator plunger in spaced relation thereto, vacuum actuated means including a cylinder and a piston slidable longitudinally therein and having a piston rod extending externally of the cylinder, means connecting the piston rod with said pedals and adapted to actuate the clutch pedal prior to the brake pedal when the piston moves from an accelerating position adjacent one end of the cylinder towards a brake-applying position adjacent the other end of the cylinder, the cylinder having a port intermediate its length and a port adjacent its last-mentioned end, a valve having a body formed with ports connected with respective ports of the cylinder and a regulating element movably mounted and formed with passages and ports movable into and out of registry with ports of the valve body by selective movements of the regulating element whereby passage of air into and out of the cylinder may be controlled and the piston moved to adjusted positions, and means between the treadle and valve for imparting movement to the regulating element of the valve when the treadle is moved to a brake-applying position adapted to momentarily interrupt movement of the regulating element when in a neutral position and permit the piston to assume a neutral position before the regulating element moves to a brake-applying position.

7. Apparatus for controlling a motor vehicle including an accelerator plunger, a clutch pedal, and a brake pedal, said apparatus comprising a cylinder, a piston slidable in said cylinder and having a rod projecting through one end of the cylinder, the other end of the cylinder and the intermediate portion thereof being formed with ports, flexible means for connecting the outer end of the piston rod with the brake pedal and clutch pedal, pipes leading from the ports of said cylinder, a valve having a body formed with ports communicating with said pipes, a regulating device movably carried by the valve body to regulate communication between the ports of the valve body and a source of suction, said regulating device being also provided with ports movable into and out of registry with the ports of the body to establish communication between the cylinder and atmosphere, and means for adjusting said regulating device including a treadle disposed over the accelerator plunger and when depressed to move the regulating device in one direction adapted to shift the plunger downwardly to an accelerating position.

8. In an apparatus for controlling a motor vehicle, a cylinder having heads at its ends, a piston in said cylinder having a piston rod extending through one head of the cylinder, means being provided whereby air may escape from the cylinder as the piston approaches the said end of the cylinder, the cylinder being provided adjacent its other end and intermediate its length with ports to communicate with pipes whereby passage of air into and out of the cylinder may be effected and the piston moved to adjusted positions longitudinally of the cylinder, and means for connecting the piston rod with a brake pedal and clutch pedal.

9. In an apparatus for controlling a motor vehicle, a cylinder having heads at its ends, a piston in said cylinder having a piston rod extending through one head of the cylinder, means being provided whereby air may escape from the cylinder as the piston aproaches the said end of the cylinder, necks extending from the cylinder near the other end thereof and intermediate its length for engagement by air pipes whereby passage of air into and out of the cylinder may be controlled and the piston moved longitudinally in the cylinder to adjusted positions, and flexible means for engagement with a brake pedal and clutch pedal connected with the piston rod.

10. In an apparatus for controlling a motor vehicle, a cylinder having heads at its ends, a piston in said cylinder having a piston rod extending through one head of the cylinder, means being provided whereby air may escape from the cylinder as the piston approaches the said end of the cylinder, necks extending from the cylinder near the other end thereof and intermediate its length for engagement by air pipes whereby passage of air into and out of the cylinder may be controlled and the piston moved longitudinally in the cylinder to adjusted positions, a cross bar pivotally mounted at one end and having its intermediate portion loosely engaged by said piston rod, and cables for engagement with a brake pedal and clutch pedal connected to the cross bar at opposite sides of said piston rod.

11. In an apparatus for controlling a motor vehicle, means for regulating passage of air into and out of a cylinder of actuating means for a brake pedal and clutch pedal, said regulating means comprising a valve body formed with ports spaced from each other, a regulating element movably carried by said body and adapted to selectively establish communication between a source of suction and the ports of the valve body when the regulating element is moved to set positions, and actuating means for the regulating element including means adapted to momentarily interrupt motion of the regulating element when the actuating means is moved quickly in one direction.

12. In an apparatus for controlling a motor vehicle, means for regulating passage of air into and out of a cylinder of actuating means for a brake pedal and clutch pedal, said regulating means comprising a valve body formed with a seat and having ports leading therefrom in spaced relation to each other diametrically of the seat, a regulating element consisting of a disk rotatably received in said seat and formed with a conduit having its ends disposed to register with the ports of the body and provided with a neck to be connected with a source of suction, the disk being formed with ports moved into and out of registry with the ports of the body when the disk is turned, and means to impart turning motion to the disk.

13. In an apparatus for controlling a motor vehicle, means for regulating passage of air into and out of a cylinder of actuating means for a brake pedal and clutch pedal, said regulating means comprising a valve body formed with a seat and having ports leading therefrom in spaced relation to each other diametrically of the seat, a regulating element consisting of a disk rotatably received in said seat and formed with a conduit having its ends disposed to register with the ports of the body and provided with a neck to be connected with a source of suction, the disk being formed with ports moved into and out of registry with the ports of the body when the disk is turned, an arm extending from said body, a handle extending from said disk below said arm and formed with an opening, a treadle pivoted intermediate its front and rear ends, a rod slidably received through the opening in said handle and carrying an abutment to engage the handle and move the disk to an adjusted position when the rod is moved upwardly, a spring between the arm and handle yieldably resisting upward movement of the handle, and means to urge the rod upwardly when the treadle is rocked to elevate its front end.

14. In an apparatus for controlling a motor vehicle, means for regulating passage of air into and out of a cylinder of actuating means for a brake pedal and clutch pedal, said regulating means comprising a valve body formed with a seat and having ports leading therefrom in spaced relation to each other diametrically of the seat, a regulating element consisting of a disk rotatably received in said seat and formed with a conduit having its ends disposed to register with the ports of the body and provided with a neck to be connected with a source of suction, the disk being formed with ports moved into and out of registry with the ports of the body when the disk is turned, an arm extending from said body, a handle extending from said disk below said arm and formed with an opening, a treadle pivoted intermediate its front and rear ends, a rod slidably received through the opening in said handle and carrying an abutment to engage the handle and move the disk to an adjusted position when the rod is moved upwardly, a spring between the arm and handle yieldably resisting upward movement of the handle, a dashpot having its lower end connected with the front end of said treadle, said rod extending into said dashpot and having a piston at its lower end slidable longitudinally of the dashpot, a spring between the piston and bottom of the dashpot, and an arm rising from the dashpot to engage said handle and move the handle to a fully raised position when the rod and dashpot are moved upwardly by movement of the treadle.

15. In an apparatus for controlling a motor vehicle, means for regulating passage of air into and out of a cylinder of actuating means for a brake pedal and clutch pedal, said regulating means comprising a valve body formed with a seat and having ports leading therefrom in spaced relation to each other diametrically of the seat, a regulating element consisting of a disk rotatably received in said seat and formed with a conduit having its ends disposed to register with the ports of the body and provided with a neck to be connected with a source of suction, the disk being formed with ports moved into and out of registry with the ports of the body when the disk is turned, an arm extending from said body, a handle extending from said disk below said arm and formed with an opening, a treadle pivoted intermediate its front and rear ends, a spring between the arm and handle yieldably resisting upward movement of the handle, and a pitman between the handle and front end of the treadle having upper and lower portions movable relative to each other and yieldably held against movement in one direction.

16. In an apparatus for controlling a motor vehicle, means for regulating passage of air into and out of a cylinder of actuating means for a brake pedal and clutch pedal, said regulating means comprising a cylindrical casing having upper and lower ports in a side portion and other upper and lower ports spaced from the first port circumferentially of the casing, a conduit connecting the second ports and adapted to be connected with a source of suction, and a block slidable in said casing and formed with passages movable into and out of registry with the ports of the casing when the block is adjusted, certain of the passages of the block establishing communication between the first ports of the casing and conduit and other passages opening the first ports to atmosphere.

17. In an apparatus for controlling a motor vehicle, means for regulating passage of air into and out of a cylinder of actuating means for a brake pedal and clutch pedal, said regulating means comprising a cylindrical casing having upper and lower ports in a side portion and other upper and lower ports spaced from the first port circumferentially of the casing, a conduit connecting the second ports and adapted to be connected with a source of suction, the upper portion of the casing being formed with another port spaced from the upper one of the first-mentioned ports at the opposite side thereof from the second ports, a block slidable in said casing and formed with passages to selectively connect the first and second-mentioned ports of the casing when the block is in adjusted positions and other passages above and below the first passages to register with the upper and lower ones of the first ports to establish communication with atmosphere when the block is in other adjusted positions, and means to adjust said block.

18. In an apparatus for controlling a motor vehicle, means for regulating passage of air into and out of a cylinder of actuating means for a brake pedal and clutch pedal, said regulating means comprising a cylindrical casing having upper and lower ports in a side portion and other upper and lower ports spaced from the first port circumferentially of the casing, a conduit connecting the second ports and adapted to be connected with a source of suction, the upper portion of the casing being formed with another port spaced from the upper one of the first-mentioned ports at the opposite side thereof from the second ports, a block slidable in said casing and formed with passages to selectively connect the first and second-mentioned ports of the casing when the block is in adjusted positions and other passages above and below the first passages to register with the upper and lower ones of the first ports to establish communication with atmosphere when the block is in other adjusted positions, said block being formed with a longitudinally extending chamber open at its lower end and having the lower one of the last-mentioned ports communicating therewith, a plunger slidable in said chamber and movable upwardly therein to a position to dispose its lower end above the lower passage, and a rod extending from the lower end of said plunger for connection with an operating element.

19. In an apparatus for controlling a motor vehicle, means for regulating passage of air into and out of a cylinder of actuating means for a brake pedal and clutch pedal, said regulating means comprising a cylindrical casing having upper and lower ports in a side portion and other upper and lower ports spaced from the first port circumferentially of the casing, a conduit connecting the second ports and adapted to be connected with a source of suction, the upper portion of the casing being formed with another port spaced from the upper one of the first-mentioned ports at the opposite side thereof from the second ports, a block slidable in said casing and formed with passages to selectively connect the first and second-mentioned ports of the casing when the block is in adjusted positions and other passages above and below the first passages to register with the upper and lower ones of the first ports to establish communication with atmosphere when the block is in other adjusted positions, said block being formed with a longitudinally extending chamber open at its lower end and having the lower one of the last-mentioned ports communicating therewith, a plunger slidable in said chamber and movable upwardly therein to a position to dispose its lower end above the lower passage, the block being formed with a port leading from its upper end and communicating with the upper portion of said chamber through a side thereof whereby air trapped in the chamber may be gradually forced out by the plunger and momentarily retard upward movement of the plunger, and means for connecting said plunger with an operating element.

ELWYNE O. SHREFFLER.
AARON D. LESAGE.